United States Patent
Wiberg et al.

(10) Patent No.: US 8,440,291 B2
(45) Date of Patent: *May 14, 2013

(54) BORDERLESS EMBLEM FOR SECURING TO A FIRST FABRIC

(75) Inventors: Robert Wiberg, Philadelphia, PA (US); Carl Jurnovoy, Philadelphia, PA (US)

(73) Assignee: Penn Emblem Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,176

(22) Filed: Jan. 13, 2012

(65) Prior Publication Data

US 2012/0114913 A1 May 10, 2012

Related U.S. Application Data

(63) Continuation-in-part of application No. 12/852,640, filed on Aug. 9, 2010.

(51) Int. Cl.
*D04D 7/00* (2006.01)
*D04D 7/02* (2006.01)

(52) U.S. Cl.
USPC .................. 428/195.1; 428/102; 428/200

(58) Field of Classification Search ............. 428/195.1, 428/102, 32.16; 112/475.09; 503/227
See application file for complete search history.

(56) References Cited

U.S. PATENT DOCUMENTS

| | | | |
|---|---|---|---|
| 3,657,060 A | 4/1972 | Haigh | |
| 3,816,211 A | 6/1974 | Haigh | |
| 3,974,010 A | 8/1976 | Cox, Jr. | |
| 4,092,451 A | 5/1978 | Sernaker | |
| 4,140,563 A | 2/1979 | Sernaker | |
| 4,597,198 A | 7/1986 | Schweitzer | |
| 4,981,742 A | 1/1991 | Haigh | |
| 5,009,943 A | 4/1991 | Stahl | |
| 5,241,919 A | 9/1993 | LaGreca | |
| 5,635,001 A | 6/1997 | Mahn, Jr. | |
| 5,817,393 A | 10/1998 | Stahl | |
| 5,878,681 A | 3/1999 | Asami et al. | |
| 6,994,044 B2 | 2/2006 | Kwon et al. | |
| 7,011,030 B1 | 3/2006 | Jans | |

(Continued)

OTHER PUBLICATIONS

Nixon Uniform Service &Medical Wear; "Healthcare Emblems, H-1 & H-2 for Lab Coats and Scrubs"; 1 page.

(Continued)

*Primary Examiner* — Maria Veronica Ewald
*Assistant Examiner* — Joanna Pleszczynska
(74) *Attorney, Agent, or Firm* — Panitch Schwarze Belisario & Nadel LLP

(57) ABSTRACT

A borderless emblem for securing to a first fabric by heat and/or pressure includes a fabric base, an emblem design applied to a front surface of the fabric base and a layer of thermoplastic adhesive material bonded to a rear surface of the fabric base. The first fabric has a predetermined weave pattern and a predetermined color. The fabric base has an outer peripheral edge and is constructed of the same or substantially the same fabric as the first fabric. The fabric base has a base color that is the same or substantially the same as the predetermined color. The fabric base is cut from a fabric utilizing a laser cutter which heats a portion of the fabric base proximate the outer peripheral edge. The laser cutter finishes the outer peripheral edge of the fabric base without including a stitched or other border.

9 Claims, 5 Drawing Sheets

U.S. PATENT DOCUMENTS

| | | | |
|---|---|---|---|
| 7,410,932 B2 * | 8/2008 | Figueroa | 503/227 |
| 7,467,593 B2 | 12/2008 | Jurnovoy | |
| 2012/0027988 A1 | 2/2012 | Jurnovoy | |
| 2012/0164403 A1 | 6/2012 | Jurnovoy | |

OTHER PUBLICATIONS

Penn Emblem Company; "PennStich® Emblems!, Perfect for Direct Sale or Rental Markets"; 1 page.

Penn Emblem Company; "PennStitch™ Emblems, Perfect for Direct Sale or Rental Markets!"; 1 page.

Ordering Emblems for CheckMark Shirts; 3 pages.

Ensign Emblem—Designs; "Signets"; http://ensign-tvc-ws02.ensignemblem.com/index/signets, prtinted Jul. 15, 2011; 1 page.

Ensign Emblem; "Customer Service, Online Ordering"; www.ensignemblem.com; 19 pages.

Aramark CheckMark™ Work Shirt (Powerpoint Presentation); 11 pages.

Aramark Uniform Services; "CheckMark Emblems—Applications"; 1 page.

Emblem Express; "Emblems and Direct Emboidery"; 7 pages.

Aramark Uniform Services and Emblem Express; "CheckMark Emblems"; 1 page.

U.S. Appl. No. 12/852,640, filed Aug. 9, 2010.

Office Action issued Jul. 9, 2012 in U.S. Appl. No. 12/844,956.

Office Action issued Oct. 29, 2012 in U.S. Appl. No. 12/852,640.

\* cited by examiner

BORDERLESS EMBLEM FOR SECURING TO A FIRST FABRIC

CROSS REFERENCE TO RELATED APPLICATIONS

The present application is a continuation-in-part of U.S. patent application Ser. No. 12/852,640, filed Aug. 9, 2010 and entitled "Borderless Emblem for Securing to a First Fabric"

BACKGROUND OF THE INVENTION

The present invention relates to borderless emblems and methods of making borderless emblems and, in particular, to borderless emblems for securing to a first fabric using at least one of heat and pressure, the emblems having an embroidered, sublimated, or printed emblem design on a fabric base with no border around the outer peripheral edge and methods of making such emblems.

In general, embroidered emblems and methods for making embroidered emblems are well known in the art. Particular embroidered emblems and methods of making such embroidered emblems are disclosed in U.S. Pat. Nos. 3,657,060 entitled "Embroidered Emblem with Thermoplastic Adhesive" and 3,816,211 entitled "Method for Making Embroidered Emblem" both of which are owned by the assignee of the present application. These two related patents disclose an embroidered emblem 110 of the type shown in FIGS. 1 and 2 of the present application and which comprises a fabric base 112 with an embroidered design 114, including an embroidered or Merrow border 114a extending around the outer peripheral edge on at least a front or first principal surface 116 of the fabric base 112. The border 114a was desirable to visually frame the embroidered design 114 and to prevent undesirable unraveling or fraying of the threads that form the fabric base 112. A layer of a thermoplastic adhesive material 118 is laminated or bonded to the rear or second principal surface 120 of the fabric base 112. In this manner, the embroidered emblem 110 can be conveniently secured or fastened to a garment, hat or other fabric surface, (referred to herein as a "first fabric") through the application of at least one of heat and pressure to melt the thermoplastic material 118 and thereby bond the fabric base 112 to the first fabric such as a garment, hat or other fabric surface. A similar emblem and method is disclosed in U.S. Pat. No. 4,981,742. The subject matter of each of the three above-mentioned patents is hereby incorporated by reference into the present application.

The above described emblems are usually made by first embroidering an emblem design 114 and preferably multiple spaced apart embroidered designs 114, onto a sheet of knit or woven fabric (not shown), adding the layer of thermoplastic adhesive material and then die cutting the fabric, preferably using a die cutter or other cutter equipment or mechanical device of a type well known in the art, to form the individual fabric base 112 for each emblem. In a commercial embodiment (not shown) a layer of non-woven textile (not shown), preferably a polyester, is bonded or laminated to the exposed surface of the layer of thermoplastic adhesive material 118 and a second layer of thermoplastic adhesive material (not shown) is then bonded or laminated to the exposed surface of the non-woven layer preferably before the fabric base 112 is cut from the fabric sheet to provide added stiffness and stability to the resulting emblem. Standard die cutting or other such cutting equipment (not shown) is adequate to cut out the fabric base 112 of each of the emblems from the fabric sheet if the fabric base 112 has a regular polygonal shape, such as a circular shape (FIG. 1) or a generally rectangular shape (FIG. 3). However, if the shape of the fabric base 112 is irregular, such as a map of the United States (not shown), the fabric base is cut from the fabric sheet by hand, using, for example, a pair of scissors. A hand operated heating device referred to as a "hot knife" may be used to heat and fuse a small portion of the polyester around the peripheral edge of the fabric base before the Merrow border is added to finish the emblem. A hot knife is essentially a standard hand held soldering iron having a fine point and a beveled edge at the tip. The tip of the soldering iron is heated to a temperature sufficiently high to melt a small portion of the polyester near the peripheral edge of the fabric base.

While the emblems disclosed in the three above-mentioned patents are quite acceptable and while the methods disclosed in the above-referenced patents are quite useful in manufacturing such emblems, there was a need for an emblem which provides an enhanced appearance when secured to a garment or other fabric. In particular, there was a need for an embroidered emblem which has a fabric base which is the same as or substantially the same as the fabric of the first fabric (garment, hat or other fabric) to which the emblem was to be secured so that when the embroidered emblem was secured to the first fabric, the fabric base of the emblem blends or fades in with the surface of the first fabric so that it appears as though the embroidered design was embroidered onto the first fabric (garment, hat or other fabric). For example, in some industries in which employees wear uniforms, the uniforms may have one or more embroidered emblems such as a company logo or employee name applied to the uniform shirt or jacket. Typically the names or other personalized information of the employees are embroidered onto the uniform shirt or jacket to provide a cleaner, neater appearance. Embroidery of an employee name to a garment in this manner adds substantial expense to the cost of the garment and, because removal of such embroidery is not feasible, precludes the garment from being re-used by another employee when the named employee leaves the company.

In addition, numerous manufacturers have previously produced and sold emblems that have an embroidered, Merrow, or stitched border extending around an outer periphery thereof. Such manufactures include Penn Emblem Company (the assignee of the present application), Ensign Emblem Ltd. and World Emblem International, Inc. At least some of these emblems previously produced, such as the CHECKMARK emblem, where made using a fabric base having the same or substantially the same color as the fabric (garment, hat or other fabric) to which the emblems were secured. Other prior art emblems, such as the H-1 and H-2 emblems sold to or for NIXON, appear to have a fabric base made of 100% polyester, white fabric and that may have been applied to a white garment such that at least the colors were the same or substantially the same. However, each of the above prior art emblems included a relatively thick or wide border around an outer periphery of the emblem. While certain of these emblems may have included a border at least slightly smaller or thinner than a conventional Merrow border, each of these borders were quite visible or noticeable when the emblem was secured to a fabric (garment, hat or other fabric), despite the fact that the colors were the same or substantially the same.

U.S. Pat. No. 7,467,593 ("the '593 patent") entitled "Embroidered Emblem for Securing to a First Fabric" (owned by the assignee of the present application and incorporated herein by reference) discloses an embroidered emblem 210 (shown in FIGS. 3-5) which like the above described prior art embroidered emblem 110 includes a fabric base 212 having a front or first principal surface 216 and a rear or second principal surface 220, an embroidered design 214, including a border 214a, stitched or embroidered into at least the front surface 216 of the fabric base 212 and a layer of thermoplastic adhesive material 218 laminated or bonded to the rear surface 220 of the fabric base 212 for securing the emblem 210 to the fabric 230 of a garment or other article. Unlike the above described prior art embroidered emblem 110, the embroidered emblem 210 of the '593 patent includes a fabric base 212 which is made of the same or substantially the same material as the fabric 230 (referred to as the "first fabric") of the shirt, jacket, hat or other garment or article to which the emblem 210 is to be attached. Preferably, the fabric base 212 of the embroidered emblem 210 at least includes the same or substantially the same weave pattern and color as the first fabric 230 so that when the emblem 210 is secured to the first fabric 230 (FIG. 5) with the weave pattern of the fabric base 212 oriented in the same manner as the weave pattern of the first fabric 230, the fabric base 212 of the emblem 210 blends in with or fades into the first fabric 230 so that the fabric base 212 of the emblem 210 is nearly invisible and the embroidered emblem design 114 appears to have been applied to the first fabric 230.

There is also a substantial difference in the border 214a disclosed in the '593 patent as compared to the above described prior art embroidered emblem 110. With the above described prior art embroidered emblem 110, the embroidered border 114a, which is located around the outer or peripheral edge of the fabric base 112, is typically made at the same time as the remainder of the embroidered design 114 using the same needle, and a yarn color (typically a color used in the embroidered design) which typically contrasts with the color of the fabric base 112 and is of a substantial thickness and/or width which corresponds to the thickness or width of the remainder of the embroidered design (see 114a of FIGS. 1 and 2 of the present application). In this manner, the border 114a serves as a frame to surround and highlight the fabric base 112 and the remainder of the embroidered design 114. In contrast, with the emblem 210 of the '593 patent, the stitched border 214a is made using a relatively small sized (i.e., gauge) embroidery needle. The yarn used to make the border 214a is relatively thin (i.e., cross-sectional area) and is the same or substantially the same color as the color of the fabric base 212 and the first fabric 230 to which the emblem 210 is to be attached. In this manner, when the emblem 210 is secured to the garment or other article (see FIG. 5), the much smaller sized border 214a fades into the fabric base 212 and the first fabric 230 of the garment or other article so that the border 214a is nearly invisible thus helping to give the appearance that the embroidered emblem design 214 has been directly sewn into or applied to the first fabric 230 and not onto a separate emblem.

The present invention provides an emblem which includes many of the features of the embroidered emblem 210 of the '593 patent. However, unlike the above described prior art emblems 110, 210, an emblem in accordance with a preferred embodiment of the present invention does not include an embroidered, Merrow or stitched border or any other kind of border extending around the outer or peripheral edge of the fabric base. Instead, the fabric base of the emblem is preferably cut from a fabric sheet using a computer controlled laser cutter that simultaneously heats and fuses the peripheral edge of the fabric base. In this manner, an emblem made in accordance with the present invention, when applied to a garment or other article provides the appearance of the emblem design having been applied onto the garment or other article but is much easier to apply to the garment and can be conveniently and completely removed from the garment to permit re-use of the garment and the emblem. A borderless emblem in accordance with the present invention is also less expensive and easier to produce than an emblem which includes an embroidered or stitched border.

BRIEF SUMMARY OF THE INVENTION

Briefly stated, in one preferred embodiment, the present application is directed to a borderless emblem for securing to a first fabric by the application of at least one of heat and pressure. The first fabric has a predetermined weave pattern and a predetermined color. The borderless emblem includes a fabric base having a front surface, a rear surface and an outer peripheral edge. The fabric base is constructed of the same or substantially the same fabric as the first fabric and has the same or substantially the same weave pattern as the first fabric. A base color of the fabric base is the same or substantially the same as the predetermined color. The fabric base is cut from a fabric utilizing a laser cutter which heats a portion of the fabric base proximate the outer peripheral edge. The laser cutter finishes the outer peripheral edge of the fabric base without including a stitched or other border. An emblem design is applied to the front surface of the fabric base. A layer of thermoplastic adhesive material is bonded to the rear surface of the fabric base for securing the fabric base to the first fabric.

In another preferred embodiment the present application is directed to a borderless emblem for securing to a first fabric by the application of at least one of heat and pressure. The borderless emblem includes a fabric base comprised of a knit or woven fabric selected from the group consisting of polyester and combinations of polyester and cotton. The fabric base has a front surface, a rear surface and an outer peripheral edge. An emblem design is applied to the front surface of the fabric base. A layer of thermoplastic adhesive material is bonded to the rear surface of the fabric base for securing the emblem to the first fabric. The fabric base is cut from the fabric utilizing a laser cutter which heats a portion of the polyester of the fabric base proximate to the outer peripheral edge during the cutting process to finish the outer peripheral edge of the fabric.

In another preferred embodiment the present invention comprises a method of making a borderless emblem for securing to a first fabric by the application of at least one of heat and pressure. The first fabric has a predetermined weave pattern and a predetermined color. The method includes the steps of providing a fabric for a fabric base having a front surface and a rear surface, applying an emblem design to the front surface, bonding a layer of thermoplastic adhesive material to the rear surface for securing the fabric base to the first fabric and cutting the fabric base from the fabric utilizing a laser cutter which heats a portion of the polyester of the fabric proximate an outer peripheral edge of the fabric base during the cutting process to finish the outer peripheral edge without the addition of a stitched or other border. The fabric base has the same or substantially the same weave pattern as the first fabric and a base color that is the same or substantially the same as the predetermined color. The first fabric and the fabric for the fabric base are constructed of polyester or a combination of polyester and cotton.

In yet another preferred embodiment the present invention comprises a method of making a borderless emblem for securing to a first fabric by the application of at least one of heat and pressure. The method includes the steps of providing a fabric for a fabric base, wherein the fabric base has a front surface and a rear surface and is constructed of polyester or a combination of polyester and cotton, applying an emblem design to the front surface, cutting the fabric base from the fabric utilizing a laser cutter which heats a portion of the polyester of the fabric proximate an outer peripheral edge of the fabric base during the cutting process to heat fuse the outer peripheral edge of the fabric base without the addition of a stitched or other border and bonding a layer of thermoplastic adhesive material to the rear surface of the fabric base for securing the fabric base to the first fabric.

In a further preferred embodiment the present invention comprises a borderless emblem for securing to a first fabric by the application of at least one of heat and pressure. The first fabric is comprised of a knit or woven fabric constructed of polyester or combinations of polyester and cotton. The first fabric has a predetermined weave pattern and a predetermined color. A fabric base has a front surface, a rear surface and an outer peripheral edge. The fabric base is constructed of the same or substantially the same material as the first fabric. The fabric base has the same or substantially the same weave pattern as the first fabric and a base color that is the same or substantially the same as the predetermined color. An emblem design is applied to the front surface of the fabric base. The emblem design has an emblem design edge. The outer peripheral edge of the fabric base is cut by a laser cutter proximate to, following and spaced from the emblem design edge by a predetermined minimum distance in the range of one sixteenth (1/16) and one half (1/2) of an inch. The outer peripheral edge of the fabric base is heat fused by the laser cutter to finish the outer peripheral edge of the fabric base without including a stitched or other border. A layer of thermoplastic adhesive material is bonded to the rear surface of the fabric base for securing the fabric base to the first fabric.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED OF THE INVENTION DESCRIPTION

Figure 1:
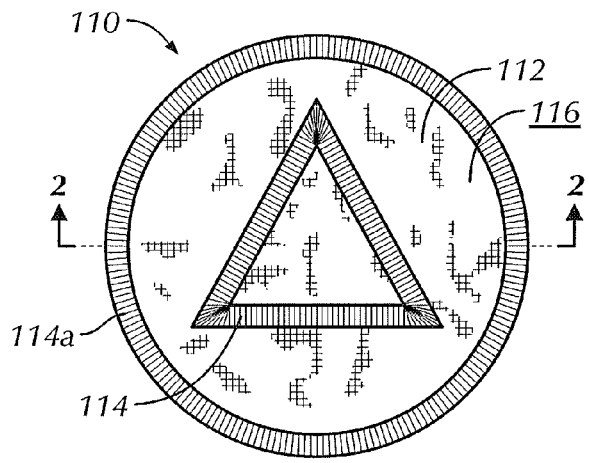
FIG. 1 is a top plan view of an embroidered emblem in accordance with the prior art.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the emblem and designated parts thereof. Unless specifically set forth herein, the terms "a", "an" and "the" are not limited to one element but instead should be read as meaning "at least one". The terminology includes the words noted above, derivatives thereof and words of similar import.

Figure 6:
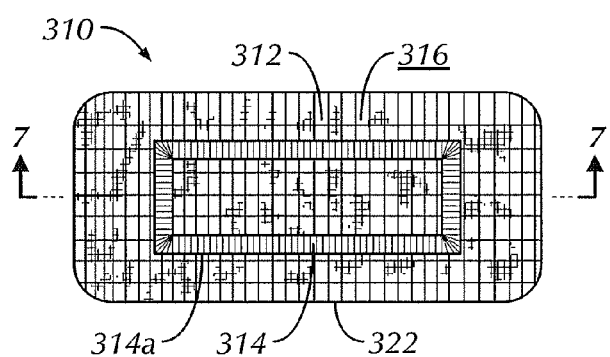
FIG. 6 is a top plan view of a borderless embroidered emblem in accordance with a first preferred embodiment of the present invention.
Figure 7:
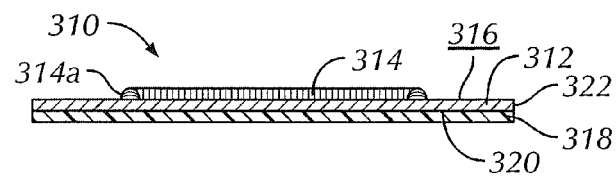
FIG. 7 is a side sectional view of the borderless embroidered emblem shown in FIG. 6 taken along line 7-7 of FIG. 6.
Figure 8:
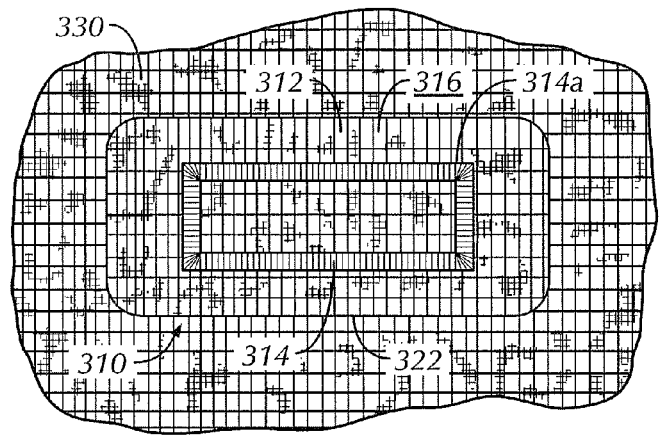
FIG. 8 is a top plan view of the borderless embroidered emblem shown in FIG. 6 after the emblem has been secured to a first fabric.

Referring to the drawings, there is shown in FIGS. 6, 7 and 8, a first preferred embodiment of an embroidered emblem, generally 310, for securing to a first fabric 330 (garment, hat or other fabric) by the application of at least one of heat and pressure in a manner as described in detail in the above-identified U.S. patents. The first fabric 330 may be a portion of a garment, such as a shirt, smock, apron, vest, hat or any other article of clothing. Alternatively, the first fabric 330 may be a portion of some other article such as a banner, flag or any other article formed of the first fabric 330. Further, while it is preferred that the first fabric 330 be comprised of a knit or woven textile fabric such as 100% polyester, 100% cotton or a polyester/cotton blend thereof, such as about 65% polyester and about 35% cotton or about 80% polyester and about 20% cotton or some other such blend, it should be clearly understood that the first fabric 330 may be made of any type of natural or synthetic textile material which has been made using techniques which are known to those of ordinary skill in the art. For example, the first fabric 330 may be formed at least partially of rayon, Gor-Tex®, or a flame retardant material. In short, the first fabric 330 may comprise virtually any suitable fabric which may or may not be coated or impregnated with one or more soil resisting or stain repellent treatments and may or may not be colored utilizing standard textile dyes of a type well known to those of ordinary skill in the art. The first fabric 330 as show in FIG. 8 is comprised of a textile material having a predetermined weave pattern and at least one predetermined color. The particular weave pattern utilized in forming the first fabric 330 should not be considered to be a limitation on the present invention nor should the particular color of the first fabric 330. Accordingly, it should be clearly understood that the embroidered emblem 310 in accordance with the present invention may be secured to a first fabric 330 having any type of weave pattern and any desired color without departing from the scope and spirit of the present invention. Thus, the first fabric 330 should not be considered a limitation of the present invention, but merely a reference point or blueprint to produce the embroidered emblem 310.

As shown in FIGS. 6 and 7, the embroidered emblem 310 in accordance with the first preferred embodiment is comprised of a fabric base 312 having a first principal or front surface 316 and a second principal or rear surface 320. In the present embodiment the fabric base 312 is generally rectangularly shaped in plan view. It will be appreciated by those of ordinary skill in the art that the shape of the fabric base 312 as well as the size of the fabric base 312 may vary in particular applications. More specifically, the fabric base 312 may be circular, square, triangular, oblong, oval or any other desired regular or irregular shape. Preferably the fabric base 312 is made of a knit or woven fabric such as 100% polyester, 100% cotton or a polyester/cotton blend, such as about 65% polyester and about 35% cotton or about 80% polyester and about 20% cotton or a similar blend. It will be appreciated that other types of textile fabrics may alternatively be used. For example, the fabric base 312 may be formed of rayon, GOR-TEX, or a flame retardant material.

As can be seen when viewing FIGS. 6 and 8, in the present embodiment the fabric base 312 preferably has the same or substantially the same weave pattern as that of the first fabric 330 and has a base color that is of the same or substantially the same color as the predetermined color of the first fabric 330. Examples of various weave patterns that may be used to form the fabric base 312 include plain, twill, satin, basket, rib, double cloth, backed cloth, pile, leno and lappet, such to name a few. The particular weave pattern of the fabric base 312 may be any of the above listed, or any other, as long as it is the same or substantially the same as the weave pattern of the first fabric 330. More preferably, the fabric base 312 is made of the same or substantially the same material or fabric and is most preferably the exact same fabric, or at least the exact same type of fabric, as the first fabric 330, so that when an embroidered emblem 310 in accordance with the first embodiment of the present invention is secured to the first fabric 330 with the weave pattern of the fabric base 312 having the same orientation as the weave pattern of the first fabric 330 as shown in FIG. 8, the fabric base 312 precisely matches the first fabric 330 so that the fabric base 312 blends in with and substantially disappears into the first fabric 330. Alternatively, the fabric base 312 may have a weave pattern and/or a base color (not shown) which is different from the weave pattern and/or predetermined color of the first fabric 330 and/or the fabric base 312 may be made from a different material than the material of the first fabric 330 so that when the fabric base 312 is secured to the first fabric 330 the fabric base 312 stands out and is easily noticeable.

The emblem 310 further includes an emblem design 314 which preferably has been embroidered into the front surface 316 of the fabric base 312 using a standard embroidery process in the manner well known in the art and as described in the above-identified patents. As best shown in FIG. 7, the embroidered emblem design 314 extends outwardly from the front surface 316 of the fabric base 312 at least by the thickness of the embroidery threads. As shown in FIGS. 6 and 8, for purposes of illustrating the present embodiment the embroidered emblem design 314 is in the form of a generally rectangular pattern shown as an emblem design edge 314a in plan view. It will be appreciated by those of ordinary skill in the art that the generally rectangularly shaped embroidered emblem design 314 is presented only for purposes of illustrating the present invention and should not be considered to be a limitation on the present invention. Virtually any other type of embroidered emblem design including designs of different shapes and sizes, characters, names and the like as well as different colors or a combination of colors may alternatively be used.

The embroidered emblem 310 further includes a layer of thermoplastic adhesive material 318 (FIG. 7) which is laminated or bonded to the rear surface 320 of the fabric base 312. The thermoplastic adhesive material 318 is preferably a polyurethane which is the same as or substantially the same as the thermoplastic adhesive material described in detail in the above-identified patents and is bonded to the rear surface 320 of the fabric base 312 in the manner described in the above-identified U.S. patents. The layer of thermoplastic adhesive material 318 is used for securing the emblem 310 to the first fabric 330 by the application of at least one of heat and pressure in the manner described in detail in the above-identified U.S. patents. In a commercial embodiment (not shown) a layer of non-woven textile (not shown), preferably a polyester, is bonded or laminated to the exposed surface of the layer of thermoplastic adhesive material 318 and a second layer of thermoplastic adhesive material (not shown) is then bonded or laminated to the exposed surface of the non-woven layer to provide added stiffness and stability to the resulting emblem 310.

Figure 2:
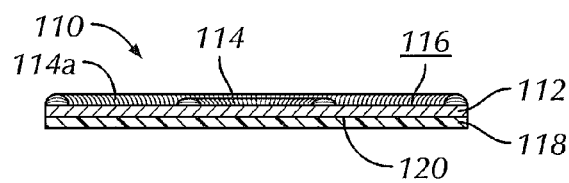
FIG. 2 is a side sectional view of the prior art emblem shown in FIG. 1 taken along line 2-2 of FIG. 1.
Figure 3:
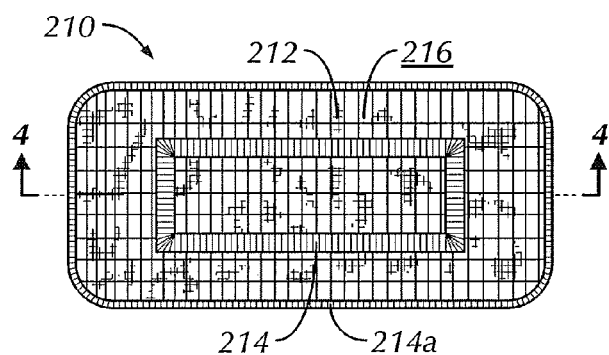
FIG. 3 is a top plan view of another embroidered emblem in accordance with the prior art.
Figure 4:
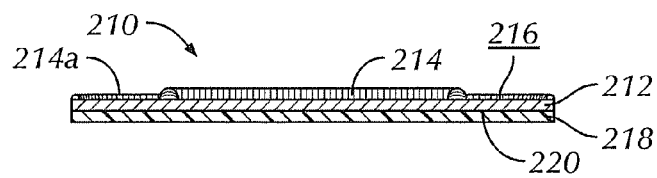
FIG. 4 is a side sectional view of the prior art emblem shown in FIG. 3 taken along line 4-4 of FIG. 3.
Figure 5:
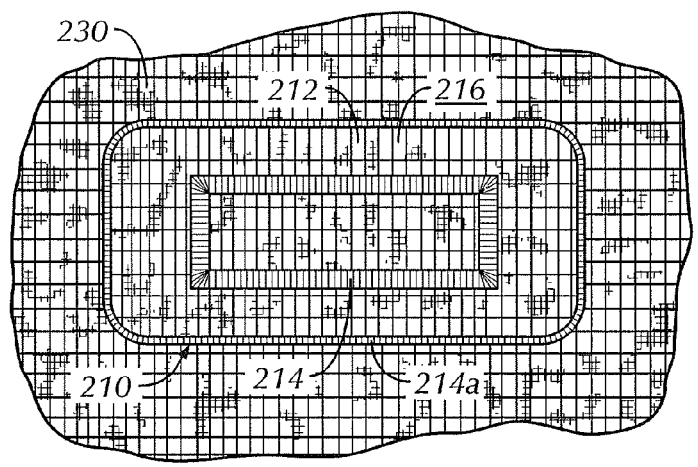
FIG. 5 is a top plan view of the prior art emblem shown in FIG. 3 after the emblem has been secured to a first fabric.

Typically, in the above described prior art embroidered emblem 110 the border 114a is a Merrow border which is typically made using a continuous filament of 100% polyester extremely bright yarn typically in size 300/4's-1200 Denier. Typically a large needle, such as a number 3DST needle is used to make such a Merrow border. The Merrow border 114 is very heavy and broad. Typically the thread used to form the Merrow border 114a is a bright color which often contrasts with the color of the fabric base 112 so that the border 114a frames and highlights the emblem 110 and particularly the emblem design 114 so it is quite visible as shown in FIGS. 1 and 2. The border 214a of the embroidered emblem 210, as described in the '593 patent, is also a stitched border which is preferably made using a much smaller 100% spun polyester intentionally dull yarn in size 60.5 Denier or 27 Tex. The needle employed for forming the stitched border 214a of the '593 patent is preferably a number DBXK5 needle which is usually smaller than the needle used for the Merrow border 114a. By making a stitched border 214a utilizing a relatively small sized (i.e., gauge) needle and by utilizing a relatively thin intentionally dull yarn which is the same or substantially the same color as that of the fabric base 212 (and the first fabric 230), the border 214a is relatively small and fades into the fabric base 212 and also fades into the first fabric 230 to become nearly invisible when the emblem 210 has been secured to the first fabric 230 as shown in FIG. 5. However, even the much smaller stitched border 214a of the prior art emblem 210 discussed in the '593 patent, which is formed of yarn that at least closely matches the color of the first fabric 230, is still visible by an observer at any of a variety of distances (such as 3 feet) from the emblem 210, particularly when the emblem 210 is secured to the first fabric 230.

The embroidered emblem 310 in accordance with the present invention is borderless. That is, unlike the above described prior art emblems 110 and 210, there is no embroidered border, Merrow border, stitched border or any other type of added border extending around the outer or peripheral edge 322 of the fabric base 312. Instead, the outer edge 322 of the fabric base 312 is finished by subjecting the outer edge 322 to heat sufficient to effectively soften and fuse a small portion of the polyester within the fabric base 312 proximate to the outer edge 322 to create a smooth finished edge 322 such that the ends of the fibers of the outer edge 322 of the fabric base 312 are sealed to prevent unraveling during use or laundering. As utilized herein, the outer edge 322 is "finished" or cut to "finish" by subjecting the outer edge 322 to heat sufficient to effectively soften and fuse at least a small portion of the material within the fabric base 312 proximate to the outer edge 322 to create a generally smooth finished edge 322 such that the finished edge 322 is sealed to prevent or typically limit unraveling during typical use. The finished outer peripheral edge 322 does not include the addition of a stitched or other border. The fusing of the outer peripheral edge 322 of the fabric base 312 may be accomplished in any known manner, such as by exposing the outer peripheral edge 322 to a heat source, such as a heat gun or hot knife. Preferably, the fabric base 312 is cut from a sheet of fabric (not shown), which may or may not contain multiple spaced apart emblem designs, preferably using a laser cutter such as a model 9050 available from CamFive Company which also fuses the outer peripheral edge 322 at the same time the fabric base 312 is cut from the fabric sheet. The laser cutter is computer controlled so the cutting out of the fabric base 312 and the fusing of the outer peripheral edge 322 of the fabric base 312 are both accomplished automatically with no hand work or additional steps. In this manner, the cost of producing an emblem 310 can be substantially reduced. It will be apparent to those of ordinary skill in the art that any other suitable laser cutter may alternatively be used to cut the fabric base 312 from a sheet of fabric and simultaneously fuse the outer peripheral edge 322. Alternatively, the fabric base 312 may first be cut from the fabric sheet using some other cutting method, such as die cutting, and then the outer peripheral edge 322 may be subjected to a heat source to heat and fuse the polyester proximate to the outer peripheral edge 322.

FIG. 8 shows the embroidered emblem 310 in accordance with the first preferred embodiment which has been secured by at least one of heat and pressure to the first fabric 330. As can be seen, because the fabric base 312 is formed of the same material as the first fabric 330, has the same weave pattern and color as the first fabric 330 and is oriented so that the weave pattern of the fabric base 312 coincides with the weave pattern of the first fabric 330, and because the fabric base 312 does not include an embroidered or stitched border, the embroidered emblem 310 completely blends in with the first fabric 330 so as to be nearly invisible. In this manner, the emblem design 314 appears as though it has been embroidered onto the first fabric 330. Of course, as is well known in the art and as described in detail in the above-identified U.S. patents, the emblem 310 may be conveniently and cleanly removed from the first fabric 330 through the application of at least one of heat and pressure thereby permitting reuse of the first fabric 330 with or without the application of another emblem. As noted above, if the weave pattern and/or color of the fabric base 312 is different from that of the first fabric 330 the emblem 310 will stand out and be noticeable when secured to the first fabric 330. For example, the predetermined color of the first fabric 330 may be starkly different than the base color of the fabric base 312 such that the fabric base 312 stands out from the first fabric 330.

Figure 9:
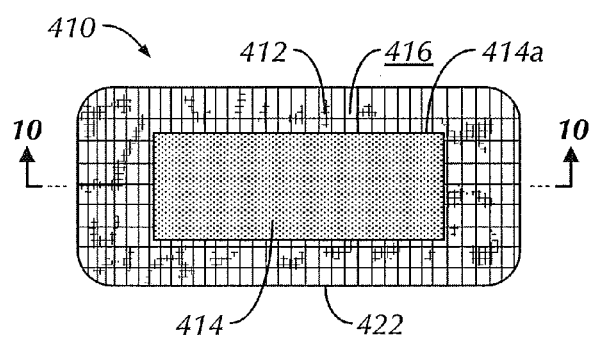
FIG. 9 is a top plan view of a borderless screen printed emblem in accordance with a second preferred embodiment of the present invention.
Figure 10:
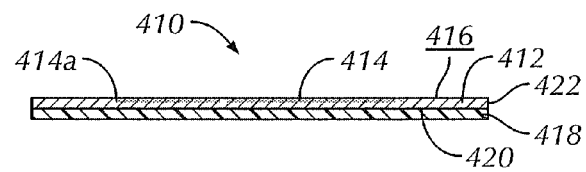
FIG. 10 is a side sectional view of the borderless screen printed emblem shown in FIG. 9 taken along line 10-10 of FIG. 9.
Figure 11:
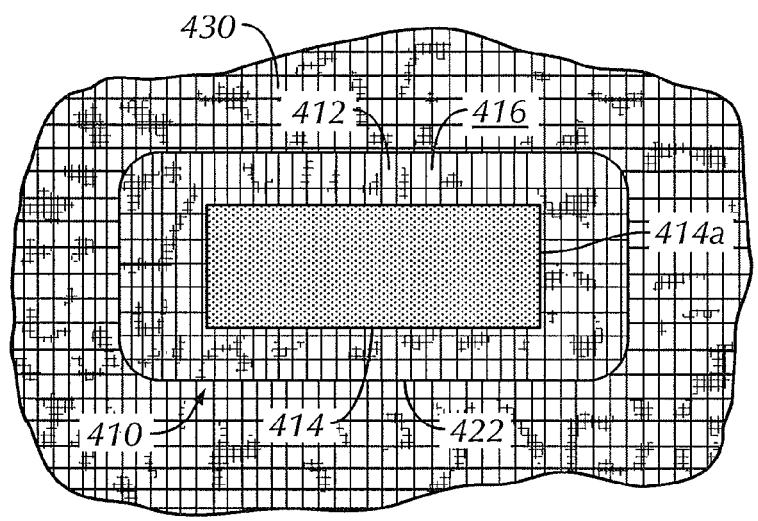
FIG. 11 is a top plan view of the borderless screen printed emblem shown in FIG. 9 after the emblem has been secured to a first fabric.

FIGS. 9, 10 and 11 show a second preferred embodiment of an emblem, generally 410, for securing to a first fabric 430 by the application of at least one of heat and pressure in a manner as described in detail in the above-identified U.S. patents and the above-described first embodiment 310. The first fabric 430 shown in FIG. 11 is the same or substantially the same as the first fabric 330 described above and is comprised of a textile material having a predetermined weave pattern and at least one predetermined color. The particular weave pattern utilized in forming the first fabric 430 should not be considered to be a limitation on the present invention nor should the particular color of the first fabric 430. Accordingly, it should be clearly understood that the emblem 410 in accordance with the present invention may be secured to a first fabric 430 having any type of weave pattern and any desired color without departing from the scope and spirit of the present invention.

As shown in FIGS. 9 and 10, the emblem 410 in accordance with the second preferred embodiment is a screen printed emblem comprised of a fabric base 412 having a first principal or front surface 416 and a second principal or rear surface 420. In the present embodiment the fabric base 412 is generally rectangularly shaped in plan view. It will be appreciated by those of ordinary skill in the art that the shape of the fabric base 412 as well as the size of the fabric base 412 may vary in particular applications. More specifically, the fabric base 412 may be circular, square, triangular, oblong, oval or any other desired regular or irregular shape. Preferably the fabric base 412 is made of the same or substantially the same material as the fabric base 312 of the above-described first embodiment. As can be seen when viewing FIGS. 9 and 11, in the present embodiment, the fabric base 412 preferably has the same or substantially the same weave pattern as that of the first fabric 430 and preferably is of the same or substantially the same color as the color of the first fabric 430. More preferably, the fabric base 412 is made of the same or substantially the same material or fabric and most preferably is made from the exact same fabric as the first fabric 430 so that when a screen printed emblem 410 in accordance with the second embodiment of the present invention is secured to the first fabric 430 with the weave patterns having the same orientation, the fabric base 412 precisely matches the first fabric 430 (weave pattern and color) so that the fabric base 412 blends in with and substantially disappears into the first fabric 430. Alternatively, the fabric base 412 may have a weave pattern and/or color (not shown) which is different from the weave pattern/color of the first fabric 430 and/or the fabric base 412 may be made from a different material than the material of the first fabric 430 so that when the fabric base 412 is secured to the first fabric 430 the fabric base 412 stands out and is easily noticeable.

The emblem 410 further includes an emblem design 414 (rectangularly shaped) which has been screen printed onto the front surface 416 of the fabric base 412 using a standard screen printing process in the manner well known in the art. As best shown in FIG. 10, the screen printed emblem design 414 essentially forms a thin layer on the front surface 416 of the fabric base 412 which extends at least slightly outwardly from the front surface 416. As shown in FIGS. 9 and 11, for purposes of illustrating the present embodiment the printed emblem design 414 is in the form of a generally rectangular pattern, which generally defines a rectangular emblem design edge 414a. It will be appreciated by those of ordinary skill in the art that the generally rectangularly shaped emblem design edge 414a and printed emblem design 414 is presented only for purposes of illustrating the present invention and should not be considered to be a limitation on the present invention. Virtually any other type of printed emblem design 414 including designs of different shapes at the emblem design edge 414a, sizes, characters and the like, as well as different colors or a combination of colors may alternatively be used.

The emblem 410 further includes a layer of thermoplastic adhesive material 418 preferably a polyurethane, which is laminated or bonded to the rear surface 420 of the fabric base 412 in the manner described in the above-identified U.S. patents. The layer of thermoplastic adhesive material 418 is used for securing the emblem 410 to the first fabric 430 by the application of at least one of heat and pressure in the manner described in detail in the above-identified U.S. patents.

The screen printed emblem 410 in accordance with the second embodiment of the present invention is also borderless. Like the emblem 310 of the above described first embodiment, the outer peripheral edge 422 of the fabric base 412 is finished by subjecting the outer peripheral edge 422 to heat sufficient to effectively fuse a small portion of the polyester within the fabric base 412 proximate to the outer peripheral edge 422 to create a smooth finished edge 422 such that the ends of the fibers of the fabric base 412 are sealed to prevent unraveling during use or laundering. The fusing of the outer peripheral edge 422 of the fabric base may be accomplished in any known manner, such described above in connection with the first embodiment. Preferably, the fabric base 412 is cut from a sheet of fabric, which may or may not contain multiple emblems, using a laser cutter such as a model 9050 available from CamFive Company which simultaneously fuses the outer peripheral edge 422.

FIG. 11 shows the screen printed emblem 410 in accordance with the second preferred embodiment which has been secured by at least one of heat and pressure to the first fabric 430. As can be seen, because the fabric base 412 is formed of the same material as the first fabric 430, has the same weave pattern and color as the first fabric 430 and is oriented with the weave pattern of the fabric base 412 extending in the same direction as the weave pattern of the first fabric 430 and because the fabric base 412 does not include a border, the screen printed emblem 410 completely blends in with the first fabric 430 so as to be nearly invisible. In this manner, the emblem design 414 appears as though it has been printed onto the first fabric 430. As noted above, if the weave pattern and/or base color of the fabric base 412 is different from the weave pattern and/or predetermined color of the first fabric 430 the emblem 410 will stand out and be noticeable when secured to the first fabric 430.

Figure 12A:
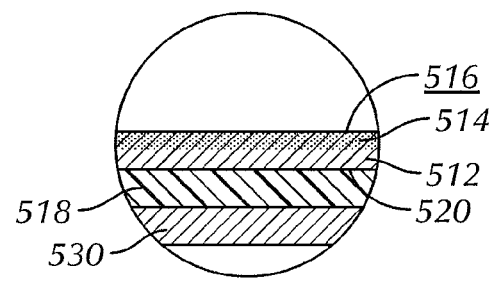
FIG. 12A is an enlarged view of the circled portion of FIG. 12.
Figure 12:
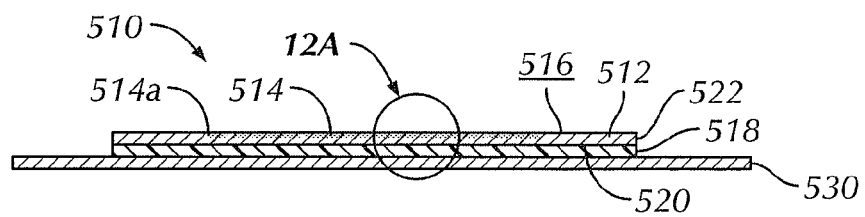
FIG. 12 is a side sectional view of a borderless ink jet printed emblem in accordance with a third preferred embodiment of the present invention.

FIGS. 12 and 12A show a third preferred embodiment of a printed emblem, generally 510, for securing to a first fabric 530 by the application of at least one of heat and pressure in a manner as described in detail in the above-identified U.S. patents. The printed emblem 510 is substantially the same as the above-described printed emblem 410 of the second embodiment with the exception of the manner in which the emblem design 514 is printed. More specifically, the emblem 510 includes a fabric base 512 which is made of the same or substantially the same material as the first fabric 530 to which the emblem 510 is attached and is preferably made of 100% polyester. Alternatively, the fabric base 512 could be made of 100% cotton or a blend of polyester and cotton in the same manner as the above-described fabric base 412. As with the emblem 410 of the second embodiment, the fabric base 512 includes a front surface 516, a rear surface 520 and a layer of thermoplastic adhesive material 518 bonded to the rear surface 520. The fabric base 512 is also borderless and the outer peripheral edge 522 is finished in the same manner as described above with respect to the outer peripheral edge 422 of the fabric base 412 of the second embodiment 410. The only substantial difference between the emblems of the second embodiment 410 and the third embodiment 510 is that the emblem design 514 of the third embodiment is printed onto the front surface 516 of the fabric base 512 using an ink jet printing process. Alternatively, the emblem design 514 may be formed by sublimation, such as by a dye-sublimation printer.

The ink jet printing process used to apply the emblem design 514 to the front surface 516 of the fabric base 512 is of a type well known in the emblem making art. As best shown in FIG. 12A, the ink jet printed emblem design 514 is at least partially embedded into the fibers of the front surface 516 of the fabric base 512 to provide the emblem design 514 with an appearance which is slightly different from the appearance of the emblem design 414 of the second embodiment 410. Like the emblem 410 of the second embodiment, for purposes of illustrating the present embodiment the printed emblem design 514 is also in the form of a generally rectangular pattern in plan view, thereby defining an emblem design edge 514a. It will be appreciated by those of ordinary skill in the art that the generally rectangular shaped printed emblem design edge 514a of the emblem design 514 is presented only for purposes of illustrating the present invention and should not be considered to be a limitation on the present invention. Virtually any other type of printed emblem design 514 including emblem design edges 514a of different shapes and sizes as well as different emblem designs 514 having different colors or a combination of colors may alternatively be used. In all other respects, the emblem 510 of the third embodiment is the same as the emblem 410 of the second embodiment.

Figure 13:
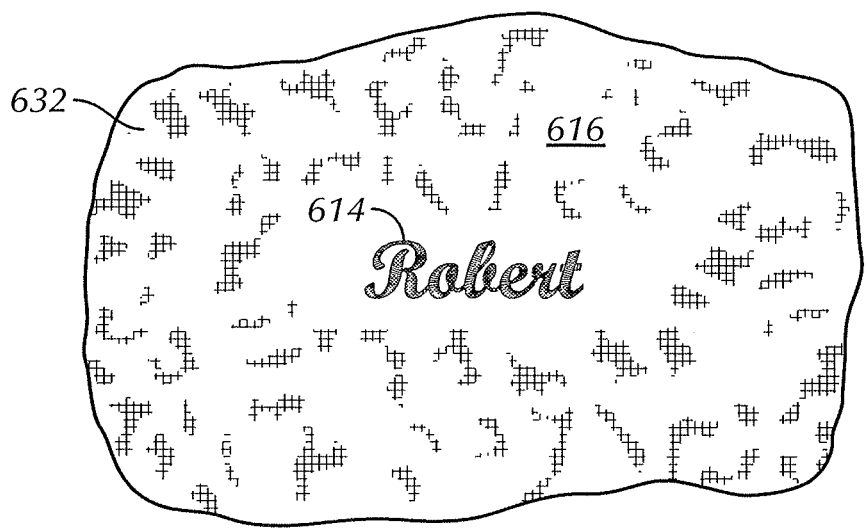
FIG. 13 is a top plan view of an emblem design which has been embroidered into a fabric sheet in accordance with an alternate embodiment of the present invention.
Figure 14:
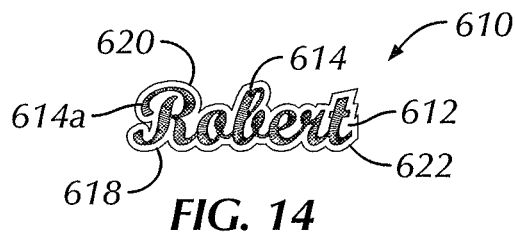
FIG. 14 is a top plan view of the emblem design of FIG. 13 which has been cut from the remainder of the fabric sheet.
Figure 15:
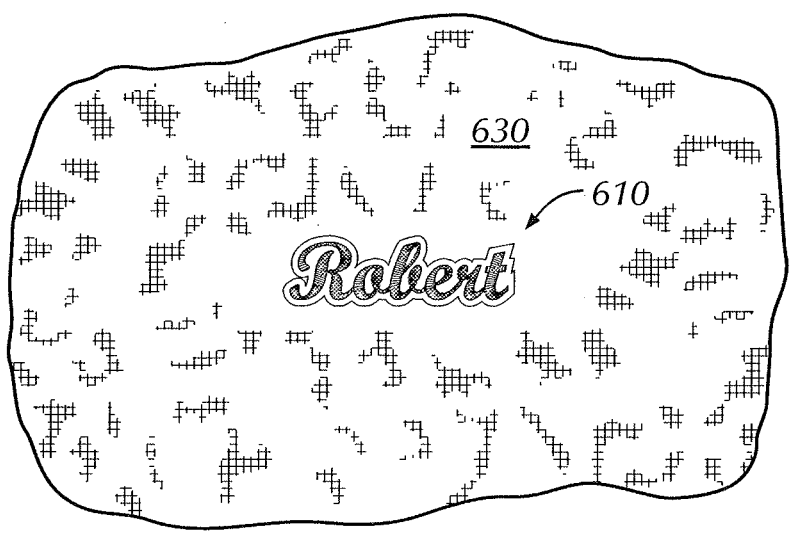
FIG. 15 is a top plan view of the emblem design of FIG. 14 after the emblem design has been secured to a first fabric.

FIGS. 13-15 illustrate an alternate embodiment of the present invention. The alternate embodiment shown in FIGS. 13-15 is substantially the same as the first embodiment as described above and shown in FIGS. 6-8 with one exception. In the alternate embodiment, instead of the outer peripheral edge 612a of the fabric base 612 being of a predetermined regular polygonal shape and extending substantially outwardly beyond an emblem design edge 614a of the emblem design 614, such as the rectangular shape shown in FIG. 6, the fabric base 612 of the emblem 610 of the alternate embodiment has substantially the same shape as the emblem design edge 614a of the emblem design 614 and the outer peripheral edge 622 of the fabric base 612 is closely proximate to the emblem design edge 614a of the emblem design 614, as described in greater detail below.

As briefly described above, embroidered emblems are typically made by first embroidering an emblem design such as the emblem design 314 of FIG. 6, onto a sheet of fabric and thereafter cutting the fabric sheet to form the fabric base 312 of the first preferred embodiment. Typically, the fabric base has a regular polygon shape, such as the rectangular shape of fabric base 312 of FIG. 6. The fabric base 312 is also typically cut from the fabric sheet so that the outer peripheral edge (322 of FIG. 6) of the fabric base 312 is spaced a substantial distance from the emblem design edge 314a of the emblem design 314. Note the substantial spacing between the emblem design edge 314a of the rectangular emblem design 314 and the outer peripheral edge 322 of the fabric base 312 of FIG. 6. The outer peripheral edge 322 of the fabric base 312 is then typically finished by adding an embroidered or Merrow border as described in detail above.

FIG. 13 shows a fabric sheet 632 of the type that is employed for making a fabric base, such as the fabric base 312 of the emblem 310 of FIG. 6. As described in detail above in accordance with the first embodiment, the fabric sheet 632 of the alternate embodiment is preferably made of a knit or woven fabric such as 100% polyester, 100% cotton or a polyester/cotton blend, such as about 65% cotton and about 35% polyester, about 70% cotton and 30% polyester, or about 80% polyester and about 20% cotton or a similar blend. More preferably, the fabric sheet 632 is of the same material as a first fabric 630 to which an emblem 610 in accordance with the alternate embodiment is to be attached. As shown in FIG. 15, the first fabric 630 as well as the fabric sheet 632 has a predetermined weave pattern and at least one predetermined color.

An emblem design 614 is embroidered into a first principle or front surface 616 of the fabric sheet 632. In the alternate embodiment of FIGS. 13-16 the emblem design 614 is an embroidered emblem design which comprises the name "Robert" in a stylized script. It will be apparent to those skilled in the art that any other embroidered emblem design or a printed emblem design of the type described above may alternatively be used. The emblem design 614 is embroidered into the front surface of the fabric sheet 632 using an embroidering technique well known in the art and at a location on the fabric sheet 632 which is not close to any other emblem designs (not shown) which may also be embroidered into the fabric sheet 632. Typically, multiple emblem designs are embroidered simultaneously or consecutively at spaced locations on a fabric sheet.

Preferably, a small sized fabric base 612 is cut from the fabric sheet 632 using a laser cutter such as a model 9050 commercially available from CamFive Company which also fuses the outer peripheral edge 622 of the fabric base 612 at the same time the fabric base 612 is cut. It will be apparent to those skilled in the art that any other suitable laser cutter may alternatively be used to cut the fabric base 612 from the fabric sheet 632 and simultaneously fuse the outer peripheral edge 622. Alternatively, the fabric base 612 may first be cut from the fabric sheet 632 using some other cutting method, such as die cutting, and then the outer peripheral edge 622 may be subjected to a heat source to heat and fuse the polyester proximate to the outer peripheral edge 622. Any other suitable techniques for cutting the fabric base 612 from the fabric sheet 632 and fusing the outer peripheral edge 622 may alternatively be employed.

As discussed above, and as best shown in FIG. 14, the fabric base 612 is cut from the fabric sheet 632 by making the cut, preferably with a laser cutter, proximate to and closely following the shape of the emblem design edge 614a of the emblem design 614. A laser cutter is preferred because it can be computer or electronically controlled to quickly, precisely and automatically cut the fabric base 612 from the fabric sheet 632. More particularly, the laser cutter may be programmed or otherwise controlled to automatically cut the fabric base 612 from the fabric sheet 632 by closely and continuously following the precise shape or contours of the emblem design edge 614a of the emblem design 614 with the cut being only slightly spaced from the emblem design edge 614a of the emblem design 614 but spaced at least a predetermined minimum distance from the emblem design edge 614a of the emblem design 614. The laser cutter may be controlled to vary the predetermined minimum distance depending on the shape of the emblem design, the type of emblem design (embroidered or printed), and other factors and may also varied at different locations around the outer periphery of a particular emblem design. However, the predetermined minimum distance, though small, must be at least large enough so that at least some of the fabric base 614 extends far enough beyond the emblem design edge 614a of the emblem design 614 to provide sufficient support for the emblem 610 (and particularly the embroidery of the emblem design 614) at least prior to attachment to a first fabric 630. In the case of the "Robert" emblem design 614 as shown, the predetermined minimum distance is preferably in the range of one sixteenth (1/16) to one half (1/2) of an inch and more preferably is about one sixteenth (1/16) to three sixteenths (3/16) of an inch. However, the actual predetermined minimum distance may vary in particular applications and need not be uniform over the entire fabric base 612.

The emblem 610 of the alternate embodiment also includes a layer of thermoplastic adhesive material 618 preferably a polyurethane, which is laminated or bonded to the rear surface 620 of the fabric base 612 in the manner described in the above-identified U.S. patents. The layer of thermoplastic adhesive material 618 may be laminated or bonded to the fabric base 612 after, but preferably before the fabric base 612 is cut from the fabric sheet 632 and is used for securing the emblem 610 to the first fabric 630 by the application of at least one of heat and pressure in the manner described in detail in the above-identified U.S. patents. In a commercial embodiment (not shown) a layer of non-woven textile (not shown), preferably a polyester, is bonded or laminated to the exposed surface of the layer of thermoplastic adhesive material 618 and a second layer of thermoplastic adhesive material (not shown) is then bonded or laminated to the exposed surface of the non-woven layer preferably before the fabric base 612 is cut from the fabric sheet 632 to provide added stiffness and stability to the resulting emblem.

Like the emblem 310 of the first embodiment, the emblem 610 in accordance with the alternate embodiment is borderless. That is, unlike the above described prior art emblems 110 and 210, there is no embroidered border, Merrow border, stitched border or any other type of added border extending around the outer peripheral edge 622 of the fabric base 612. Instead, the outer peripheral edge 622 of the fabric base 612 is finished by subjecting the outer peripheral edge 622 to heat sufficient to effectively soften and fuse a small portion of the polyester within the fabric base 612 proximate to the outer peripheral edge 622 to create a smooth finished edge such that the ends of the fibers of the outer peripheral edge 622 of the fabric base 612 are sealed to prevent unraveling during use or laundering. The fusing of the outer peripheral edge 622 of the fabric base 612 may be accomplished in any known manner, such as by exposing the edge 622 to a heat source, such as a heat gun. Preferably, as discussed above, the fabric base 612 is cut from the fabric sheet 632 using a laser cutter which fuses the outer peripheral edge 622 at the same time the fabric base 612 is cut from the fabric sheet 632.

FIG. 15 shows the embroidered emblem 610 in accordance with the alternate embodiment which has been secured to the first fabric 630 by at least one of heat and pressure and preferably both. As can be seen, because the fabric base 612 is formed of the same material as the first fabric 630, has the same weave pattern and color and is oriented with the weave pattern of the fabric base 612 extending in the same manner as the weave pattern of the first fabric 630 and because the fabric base 612 is relatively small as compared to the size of the emblem design 614 and does not include an embroidered or stitched border, the embroidered emblem 610 completely blends in with the first fabric 630 so as to be nearly invisible. In this manner, the emblem design 614 appears as though it has been embroidered onto the first fabric 630. Of course, the emblem 610 may be conveniently and cleanly removed from the first fabric 630 through the application of at least one of heat and pressure thereby permitting reuse of the first fabric 630 with or without the application of another emblem. In this manner, the emblem 610 of the alternative embodiment provides all of the advantages of the emblems of the above-described embodiments but with the added advantage of the much smaller sized portion of the fabric base 612 surrounding the emblem design 614 being even less noticeable when the emblem 610 is secured to the first fabric 630.

It will be appreciated by those skilled in the art that changes could be made to the embodiments described above without departing from the broad inventive concepts thereof. It is understood, therefore, that this invention is not limited to the particular embodiments disclosed, but it is intended to cover all modifications within the spirit and scope of the present invention as defined by the appended claims.

We claim:

1. An assembly for securing a borderless emblem to a garment by application of at least one of heat and pressure, the assembly comprising:
   a first fabric comprised of a portion of the garment, the first fabric having a predetermined weave pattern and a predetermined color;
   a fabric base having a front surface, a rear surface and an outer peripheral edge, the fabric base being of the same or substantially the same fabric as the first fabric and having the same or substantially the same weave pattern as the first fabric, a base color of the fabric base being the same or substantially the same as the predetermined color, the fabric base being cut from a fabric utilizing a laser cutter which heats a portion of the fabric base proximate the outer peripheral edge, the laser cutter finishing the outer peripheral edge of the fabric base without including a stitched or other border;
   an emblem design embroidered into the front surface of the fabric base; and
   a layer of thermoplastic adhesive material bonded to the rear surface of the fabric base for securing the fabric base to the first fabric, wherein the outer peripheral edge of the fabric base does not include the stitched or other border when secured to the first fabric.

2. The assembly as recited in claim 1 wherein the first fabric is a knit or woven fabric, the first fabric and the fabric of the fabric base are selected from the group consisting of polyester and combinations of polyester and cotton.

3. The assembly as recited in claim 2 wherein the fabric base is cut from the fabric proximate to and following an emblem design edge, the outer peripheral edge of the fabric base spaced a predetermined minimum distance from the emblem design edge.

4. The assembly as recited in claim 3 wherein the predetermined minimum distance is in the range of one sixteenth (1/16) to one half (1/2) of an inch.

5. An assembly for securing a borderless emblem to a garment by application of at least one of heat and pressure, the assembly comprising:
   a first fabric comprised of a portion of the garment;
   a fabric base comprised of a knit or woven fabric selected from the group consisting of polyester and combinations of polyester and cotton and having a front surface, a rear surface and an outer peripheral edge;
   an embroidered emblem design applied to the front surface of the fabric base defining an emblem design edge; and
   a layer of thermoplastic adhesive material bonded to the rear surface of the fabric base, the thermoplastic adhesive material securing the emblem to the first fabric, the fabric base being cut from the fabric utilizing a laser cutter which heats a portion of the polyester of the fabric base proximate to the outer peripheral edge during the cutting process to finish the outer peripheral edge of the fabric, the outer peripheral edge of the fabric base does not include a stitched or other border when secured to the first fabric, the outer peripheral edge spaced from and continuously following the precise contours of the emblem design edge.

6. The assembly as recited in claim 5 wherein the fabric base and the first fabric are comprised of the same fabric.

7. The assembly as recited in claim 5 wherein the fabric base is cut from the fabric proximate to the emblem design edge, the outer peripheral edge being spaced a predetermined minimum distance from the emblem design edge.

8. The assembly as recited in claim 7 wherein the predetermined minimum distance is in the range of one sixteenth (1/16) to one half (1/2) of an inch.

9. An assembly for securing a borderless emblem to a garment by application of at least one of heat and pressure, the assembly comprising:
   a first fabric being comprised of a knit or woven fabric selected from the group consisting of polyester and combinations of polyester and cotton and having a predetermined weave pattern and a predetermined color;
   a fabric base having a front surface, a rear surface and an outer peripheral edge, the fabric base being of the same or substantially the same material as the first fabric, having the same or substantially the same weave pattern and having a base color that is the same or substantially the same as the predetermined color;
   an emblem design embroidered into the front surface of the fabric base, the emblem design having an emblem design edge, the outer peripheral edge of the fabric base being cut by a laser cutter proximate to, following and spaced from the emblem design edge by a predetermined minimum distance in the range of one sixteenth (1/16) and one half (1/2) of an inch, the outer peripheral edge of the fabric base being heat fused by the laser cutter to finish the outer peripheral edge of the fabric base without including a stitched or other border; and
   a layer of thermoplastic adhesive material bonded to the rear surface of the fabric base for securing the fabric base to the first fabric, wherein the outer peripheral edge of the fabric base does not include the stitched or other border when secured to the first fabric.

* * * * *